US012225911B2

United States Patent
Ur Rehman et al.

(10) Patent No.: US 12,225,911 B2
(45) Date of Patent: Feb. 18, 2025

(54) PRODUCTION AND SEPARATION OF MILK FRACTIONS WITH DIAFILTRATION

(71) Applicant: fairlife, LLC, Chicago, IL (US)

(72) Inventors: Shakeel Ur Rehman, Naperville, IL (US); Timothy P. Doelman, Glencoe, IL (US); Michael J. McCloskey, DeMotte, IN (US); Hans Maron, Goodyear, AZ (US)

(73) Assignee: fairlife, LLC, Chicago, IL (US)

( * ) Notice: Subject to any disclaimer, the term of this patent is extended or adjusted under 35 U.S.C. 154(b) by 1078 days.

(21) Appl. No.: 17/050,997

(22) PCT Filed: Apr. 9, 2019

(86) PCT No.: PCT/US2019/026539
§ 371 (c)(1),
(2) Date: Oct. 27, 2020

(87) PCT Pub. No.: WO2019/212704
PCT Pub. Date: Nov. 7, 2019

(65) Prior Publication Data
US 2021/0227844 A1    Jul. 29, 2021

Related U.S. Application Data

(60) Provisional application No. 62/665,670, filed on May 2, 2018.

(51) Int. Cl.
*A23C 9/142* (2006.01)
*A23C 9/12* (2006.01)
(Continued)

(52) U.S. Cl.
CPC .......... *A23C 9/1422* (2013.01); *A23C 9/1206* (2013.01); *A23C 9/1427* (2013.01);
(Continued)

(58) Field of Classification Search
CPC ... A23C 9/1422; A23C 9/1206; A23C 9/1427; A23C 2210/202; A23C 2210/252;
(Continued)

(56) References Cited

U.S. PATENT DOCUMENTS 7,169,428 B2    1/2007    Dunker et al.
7,829,130 B2    11/2010    Tossavainen et al.
(Continued)

FOREIGN PATENT DOCUMENTS

EP      2 675 281 B1    4/2015
WO      01/93689 A1     12/2001
WO      2012/110705 A1   8/2012

OTHER PUBLICATIONS

International Search Report and Written Opinion of the International Searching Authority for International Patent Application No. PCT/US2019/026539 mailed Jul. 24, 2019, 15 pages.
(Continued)

*Primary Examiner* — Donald R Spamer
*Assistant Examiner* — Assaf Zilbering
(74) *Attorney, Agent, or Firm* — Merchant & Gould P.C.

(57) ABSTRACT

Disclosed are methods for preparing dairy compositions using an ultrafiltration step and a nanofiltration step, followed by diafiltration of the nanofiltration retentate, and then at least one of a reverse osmosis and a forward osmosis step.

24 Claims, 1 Drawing Sheet

(51) Int. Cl.
*B01D 61/00* (2006.01)
*B01D 61/02* (2006.01)
*B01D 61/14* (2006.01)
*B01D 61/58* (2006.01)

(52) U.S. Cl.
CPC ......... *B01D 61/002* (2013.01); *B01D 61/025* (2013.01); *B01D 61/027* (2013.01); *B01D 61/145* (2013.01); *B01D 61/58* (2013.01); *A23C 2210/202* (2013.01); *A23C 2210/206* (2013.01); *A23C 2210/252* (2013.01); *A23C 2210/254* (2013.01); *B01D 2311/06* (2013.01); *B01D 2311/08* (2013.01); *B01D 2315/16* (2013.01)

(58) Field of Classification Search
CPC ............ A23C 2210/254; B01D 61/002; B01D 61/025; B01D 61/027; B01D 61/145; B01D 61/58; B01D 2311/06; B01D 2311/08; B01D 2315/16
See application file for complete search history.

(56) References Cited

U.S. PATENT DOCUMENTS

| | | | |
|---|---|---|---|
| 8,445,053 | B2 | 5/2013 | Holst et al. |
| 9,510,606 | B2 | 12/2016 | Ur-Rehman et al. |
| 9,538,770 | B2 | 1/2017 | Ur-Rehman et al. |
| 10,080,372 | B2 | 9/2018 | Kallioinen et al. |
| 2005/0214409 | A1 | 9/2005 | Tossavainen et al. |
| 2013/0309353 | A1 | 11/2013 | Ur-Rehman et al. |
| 2013/0309354 | A1* | 11/2013 | Ur-Rehman ......... A23C 9/1512 426/42 |
| 2016/0174586 | A1 | 6/2016 | Puigferrat et al. |
| 2016/0330989 | A1 | 11/2016 | Bedi et al. |
| 2017/0079297 | A1* | 3/2017 | Ur-Rehman ......... A23C 9/1422 |

OTHER PUBLICATIONS

Third Party Observation and additional comments filed in International Patent Application No. PCT/US2019/026539, submitted Jul. 10, 2020, 11 pages.

Hasanoglu, A. et al., "Concentration of Skim Milk and Dairy Products by Forward Osmosis", JOTCSB, 1(1): 149-160 (2017).

Pal, P. et al., "Development and analysis of a sustainable technology in manufacturing acetic acid and whey protein from waste cheese whey", Journal of Cleaner Production, 112: 59-70 (2015).

Chandrapala et al., "Nanofiltration and nanodiafiltration of acid whey as a function of pH and temperature," Separation and Purification Technology 160 (2016) pp. 18-27.

* cited by examiner

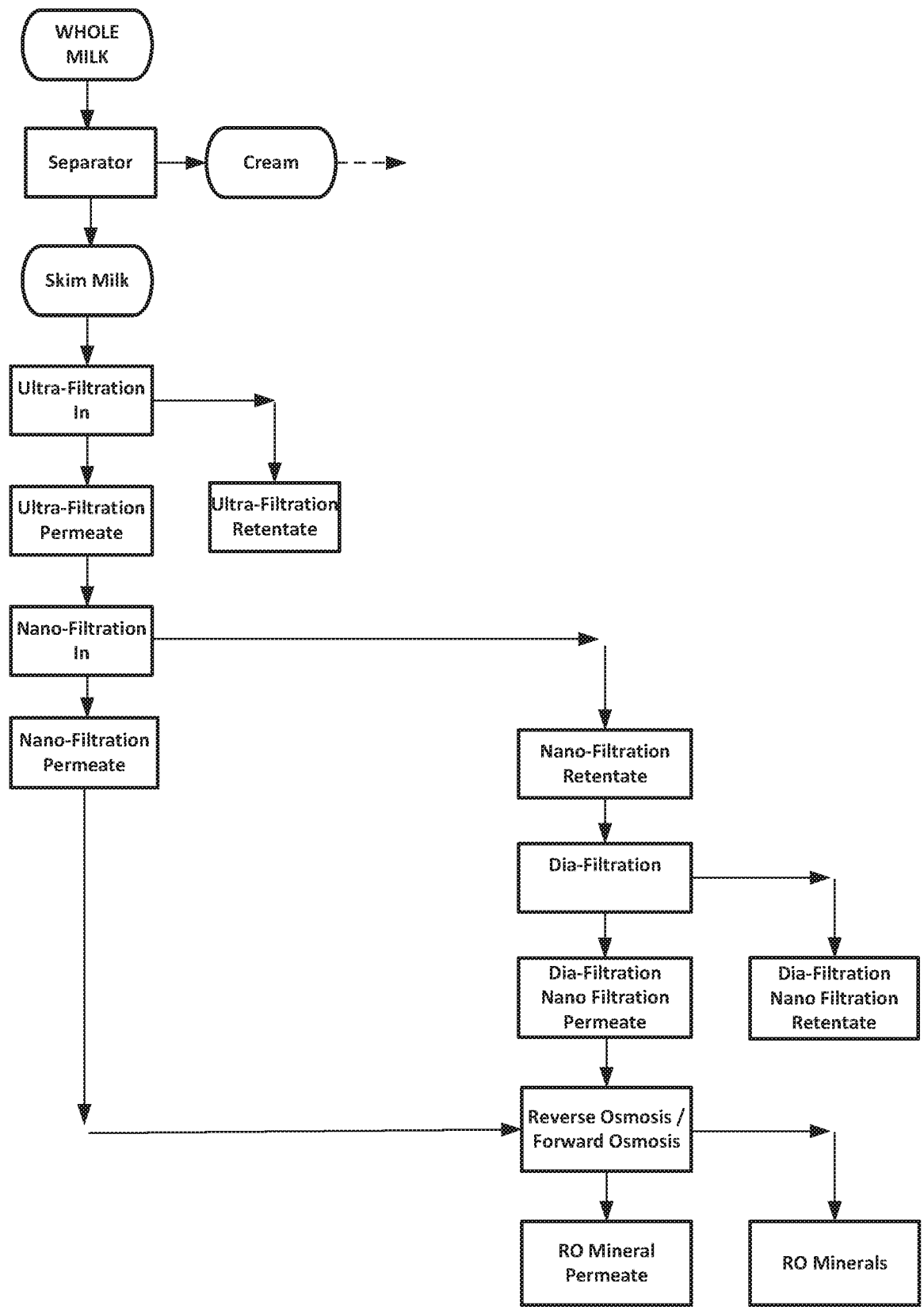

PRODUCTION AND SEPARATION OF MILK FRACTIONS WITH DIAFILTRATION

REFERENCE TO RELATED APPLICATIONS

This application is a National Stage Application of PCT/US2019/026539, filed on Apr. 9, 2019, which claims priority to U.S. Provisional Patent Application No. 62/665,670, filed on May 2, 2018, the disclosures of which are incorporated herein by reference in their entirety. To the extent appropriate, a claim of priority is made to the above disclosed applications.

BACKGROUND OF THE INVENTION

The present invention relates generally to separating a milk product into protein, fat, carbohydrate, and mineral components using combinations of ultrafiltration, nanofiltration, diafiltration, and osmosis techniques. Also encompassed are dairy compositions produced by mixing the milk components in various combinations and proportions.

Membrane filtration processes are non-thermal fractionation and concentration technologies for fluids. When a fluid is passed through a semi-permeable membrane under pressure, the components that get retained on the surface of the membranes are called retentates or concentrates, while the materials that pass through the membrane are collectively called the permeate. Membrane technologies generally do not involve heat or chemicals for fractionation or concentration, and therefore do not adversely affect the properties of the fluid, which is beneficial for milk and its components. When fluids like milk are fractionated by these membrane technologies, typically proteins do not get denatured, enzymes do not get inactivated, vitamins are not destroyed, and reactions between proteins and sugars do not occur.

SUMMARY OF THE INVENTION

This summary is provided to introduce a selection of concepts in a simplified form that are further described herein. This summary is not intended to identify required or essential features of the claimed subject matter. Nor is this summary intended to be used to limit the scope of the claimed subject matter.

Consistent with embodiments of this invention, a first method for making a dairy composition is disclosed, and the first method can comprise (a) ultrafiltering a milk product to produce a UF permeate fraction and a UF retentate fraction, (b) nanofiltering the UF permeate fraction to produce a NF permeate fraction and a NF retentate fraction, (c) diafiltering the NF retentate fraction to produce a DF/NF permeate fraction and a DF/NF retentate fraction, (d) subjecting the NF permeate fraction, the DF/NF permeate fraction, or a combination thereof, to a reverse osmosis step to produce a concentrated mineral fraction and a milk water fraction, and (e) combining at least two of the UF retentate fraction, the DF/NF retentate fraction, the concentrated mineral fraction, the milk water fraction, and a fat-rich fraction to form the dairy composition. In some embodiments, the combining step can comprise combining at least the UF retentate fraction and the concentrated mineral fraction, while in other embodiments, the combining step can comprise combining at least the fat-rich fraction, the UF retentate fraction, and the concentrated mineral fraction.

A second method for making a dairy composition also is disclosed herein, and the second method can comprise (i) ultrafiltering a milk product to produce a UF permeate fraction and a UF retentate fraction, (ii) nanofiltering the UF permeate fraction to produce a NF permeate fraction and a NF retentate fraction, (iii) diafiltering the NF retentate fraction to produce a DF/NF permeate fraction and a DF/NF retentate fraction, (iv) subjecting the NF permeate fraction, the DF/NF permeate fraction, or a combination thereof, to a forward osmosis step to produce a mineral concentrate and a milk water fraction, and (v) combining at least two of the UF retentate fraction, the DF/NF retentate fraction, the mineral concentrate, the milk water fraction, and a fat-rich fraction to form the dairy composition. In some embodiments, the combining step can comprise combining at least the UF retentate fraction and the mineral concentrate, while in other embodiments, the combining step can comprise combining at least the fat-rich fraction, the UF retentate fraction, and the mineral concentrate.

Both the foregoing summary and the following detailed description provide examples and are explanatory only. Accordingly, the foregoing summary and the following detailed description should not be considered to be restrictive. Further, features or variations can be provided in addition to those set forth herein. For example, certain embodiments can be directed to various feature combinations and sub-combinations described in the detailed description.

BRIEF DESCRIPTION OF THE FIGURE

FIG. 1 presents a schematic flow diagram of a separations process consistent with embodiments of this invention, which utilizes diafiltration of a nanofiltration retentate.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition can be applied. To the extent that any definition or usage provided by any document incorporated herein by reference conflicts with the definition or usage provided herein, the definition or usage provided herein controls.

Herein, features of the subject matter are described such that, within particular aspects and/or embodiments, a combination of different features can be envisioned. For each and every aspect, and/or embodiment, and/or feature disclosed herein, all combinations that do not detrimentally affect the designs, compositions, processes, and/or methods described herein are contemplated with or without explicit description of the particular combination. Additionally, unless explicitly recited otherwise, any aspect, and/or embodiment, and/or feature disclosed herein can be combined to describe inventive designs, compositions, processes, and/or methods consistent with the present invention.

In this disclosure, while compositions and methods are often described in terms of "comprising" various components or steps, the compositions and methods can also "consist essentially of" or "consist of" the various components or steps, unless stated otherwise. For example, a dairy composition consistent with embodiments of the present invention can comprise; alternatively, can consist essentially of; or alternatively, can consist of; a fat-rich fraction, a UF retentate fraction, and a concentrated mineral fraction.

The terms "a," "an," and "the" are intended to include plural alternatives, e.g., at least one, unless otherwise specified. For instance, the disclosure of "an ingredient" and "an additional milk fraction" are meant to encompass one, or mixtures or combinations of more than one, ingredient and additional milk fraction, unless otherwise specified.

In the disclosed methods, the term "combining" encompasses the contacting of components in any order, in any manner, and for any length of time, unless otherwise specified. For example, the components can be combined by blending or mixing.

The "lactose fraction" is meant to encompass a milk component fraction that is rich in lactose or any derivatives thereof, e.g., hydrolyzed, un-hydrolyzed, epimerized, isomerized, or converted to oligosaccharides, as would be recognized by one of skill in the art. Moreover, unless stated otherwise, this term also is meant to encompass glucose/ galactose, such as may be produced by the treatment of lactose with lactase enzyme.

Although any methods and materials similar or equivalent to those described herein can be used in the practice or testing of the invention, the typical methods and materials are herein described.

Various numerical ranges are disclosed herein. When a range of any type is disclosed or claimed herein, the intent is to disclose or claim individually each possible number that such a range could reasonably encompass, including end points of the range as well as any sub-ranges and combinations of sub-ranges encompassed therein, unless otherwise specified. As a representative example, the present application discloses that a UF retentate fraction can have, in certain embodiments, from about 9 to about 15 wt. % protein. By a disclosure that the protein content of the UF retentate fraction can be in a range from about 9 to about 15 wt. %, the intent is to recite that the protein content can be any amount within the range and, for example, can be equal to about 9, about 10, about 11, about 12, about 13, about 14, or about 15 wt. %. Additionally, the UF retentate fraction can contain an amount of protein within any range from about 9 to about 15 wt. % (for example, from about 10 to about 14 wt. %), and this also includes any combination of ranges between about 9 and about 15 wt. %. Further, in all instances, where "about" a particular value is disclosed, then that value itself is disclosed. Thus, the disclosure of a protein content from about 9 to about 15 wt. % also discloses a protein content from 9 to 15 wt. % (for example, from 10 to 14 wt. %), and this also includes any combination of ranges between 9 and 15 wt. %. Likewise, all other ranges disclosed herein should be interpreted in a manner similar to this example.

The term "about" means that amounts, sizes, formulations, parameters, and other quantities and characteristics are not and need not be exact, but may be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

Methods for making dairy compositions are disclosed and described herein. Such methods can utilize ultrafiltration, nanofiltration, and diafiltration, followed by a reverse osmosis step and/or a forward osmosis step. Specifically, in these methods, the nanofiltration retentate (NF retentate) can be subjected to a diafiltration step.

While not wishing to be bound by theory, it is believed that, while the NF retentate fraction is lactose-rich, the NF retentate fraction also contains significant amounts of important minerals—such as Ca, Mg, Na, and K—which could be lost if the lactose-rich NF retentate fraction is not treated further. Thus, a significant benefit of the methods disclosed herein is the extraction of additional minerals from the NF retentate fraction, which can be used in the production of a dairy composition, instead of being lost in the lactose-rich NF retentate fraction. In some instances, the amount of additional minerals recovered can exceed 10% or 20%, and often can approach 50%, or more.

In addition to the use of the additional minerals in dairy compositions, as disclosed herein, the additional minerals extracted from the NF retentate fraction can be used in hypotonic, hypertonic, or iso-tonic beverages, non-limiting examples of which include functional waters and juices.

Another benefit is a purified lactose-rich stream, with reduced levels of other milk components, such as a reduced mineral content. The purified lactose stream can be used in pharmaceutical applications and to produce lactose powder, as well as for conversion into lactic acid, lactobionic acid, or ethanol. It is believed that the presence of high levels of minerals may inhibit enzyme reactions for converting lactose into ethanol, thus the purified lactose-rich streams resulting from the methods disclosed herein are advantageous.

In membrane filtration systems without the diafiltration step, a higher amount of milk starting material has to be used to form a milk product with a desired mineral content. In contrast, with the methods disclosed herein, less starting milk material is needed due to the additional mineral recovery from the NF retentate fraction, resulting in a more efficient overall process to form a desired dairy composition, with less waste.

In accordance with an embodiment of this invention, a first method for making a dairy composition can comprise (or consist essentially of, or consist of) (a) ultrafiltering a milk product to produce a UF permeate fraction and a UF retentate fraction, (b) nanofiltering the UF permeate fraction to produce a NF permeate fraction and a NF retentate fraction, (c) diafiltering the NF retentate fraction to produce a DF/NF permeate fraction and a DF/NF retentate fraction, (d) subjecting the NF permeate fraction, the DF/NF permeate fraction, or a combination thereof, to a reverse osmosis step to produce a concentrated mineral fraction and a milk water fraction, and (e) combining at least two of the UF retentate fraction, the DF/NF retentate fraction, the concentrated mineral fraction, the milk water fraction, and a fat-rich fraction to form the dairy composition. In some embodiments, the combining step can comprise combining at least the UF retentate fraction and the concentrated mineral fraction, while in other embodiments, the combining step can comprise combining at least the fat-rich fraction, the UF retentate fraction, and the concentrated mineral fraction.

In accordance with another embodiment of this invention, a second method for making a dairy composition can comprise (or consist essentially of, or consist of) (i) ultrafiltering a milk product to produce a UF permeate fraction and a UF retentate fraction, (ii) nanofiltering the UF permeate fraction to produce a NF permeate fraction and a NF retentate fraction, (iii) diafiltering the NF retentate fraction to produce a DF/NF permeate fraction and a DF/NF retentate fraction, (iv) subjecting the NF permeate fraction, the DF/NF permeate fraction, or a combination thereof, to a forward osmosis step to produce a mineral concentrate and a milk water fraction, and (v) combining at least two of the UF retentate fraction, the DF/NF retentate fraction, the mineral concentrate, the milk water fraction, and a fat-rich fraction to form the dairy composition. In some embodiments, the combining step can comprise combining at least the UF retentate fraction and the mineral concentrate, while in other embodiments, the combining step can comprise combining at least the fat-rich fraction, the UF retentate fraction, and the mineral concentrate.

Generally, the features of these first and second methods (e.g., the characteristics of the milk product, the ultrafiltering step and the resultant UF permeate fraction and UF retentate fraction, the nanofiltering step and the resultant NF permeate fraction and NF retentate fraction, the diafiltering step and the resultant DF/NF permeate fraction and DF/NF retentate fraction, the reverse osmosis step and the resultant concentrated mineral fraction and milk water fraction, the forward osmosis step and the resultant mineral concentrate and milk water fraction, and the components that are combined to form the dairy composition, among others) are independently described herein and these features can be combined in any combination to further describe the disclosed methods. Moreover, other process steps can be conducted before, during, and/or after any of the steps listed in the disclosed methods, unless stated otherwise. Additionally, any dairy compositions (e.g., finished milk products, ready for consumption) produced in accordance with any of the disclosed methods are within the scope of this disclosure and are encompassed herein.

Filtration technologies (e.g., ultrafiltration, nanofiltration, diafiltration, etc.) can separate or concentrate components in mixtures—such as milk—by passing the mixture through a membrane system (or selective barrier) under suitable conditions (e.g., pressure). The concentration/separation can be, therefore, based on molecular size. The stream that is retained by the membrane is called the retentate (or concentrate). The stream that passes through the pores of the membrane is called the permeate. Referring now to the first method for making a dairy composition, this method can comprise (a) ultrafiltering a milk product to produce a UF permeate fraction and a UF retentate fraction, (b) nanofiltering the UF permeate fraction to produce a NF permeate fraction and a NF retentate fraction, (c) diafiltering the NF retentate fraction to produce a DF/NF permeate fraction and a DF/NF retentate fraction, (d) subjecting the NF permeate fraction, the DF/NF permeate fraction, or a combination thereof, to a reverse osmosis step to produce a concentrated mineral fraction and a milk water fraction, and (e) combining at least two of the UF retentate fraction, the DF/NF retentate fraction, the concentrated mineral fraction, the milk water fraction, and a fat-rich fraction to form the dairy composition.

The milk product in step (a) can comprise (or consist essentially of, or consist of) skim milk, or alternatively, whole milk. In some embodiments, the first method can further comprise a step of separating (e.g., centrifugally separating) a raw milk or fresh milk (whole milk) into the milk product (also referred to as skim milk) and a fat-rich fraction (also referred to as cream or butter fat). The raw milk or fresh milk (whole milk) can be cow's milk, which contains approximately 87 wt. % water, 3-4 wt. % protein, 4-5 wt. % carbohydrates/lactose, 3-4 wt. % fat, and 0.3-0.8 wt. % minerals. When the fresh or raw milk product is separated into the skim milk product and the fat-rich fraction, the fat-rich fraction typically contains high levels of fat (e.g., 20-50 wt. % fat, or 30-50 wt. % fat) and solids (e.g., 30-60 wt. %, or 40-55 wt. %), and often contains approximately 1.5-4 wt. % protein, 2-5 wt. % lactose, and 0.2-0.9 wt. % minerals, although not limited thereto.

In step (a), ultrafiltering of the milk product can be conducted using ultrafiltration membranes with pore sizes that typically are in the 0.01 to 0.1 micron range. In the dairy industry, the ultrafiltration membranes often are identified based on molecular weight cut-off (MWCO), rather than pore size. The molecular weight cut-off for ultrafiltration membranes can vary from 1000-100,000 Daltons, or from 10,000-100,000 Daltons. For instance, the milk product can be ultrafiltered using a polymeric membrane system (ceramic membranes also can be employed). The polymeric membrane system (or ceramic membrane system) can be configured with pore sizes such that the materials having molecular weights greater than about 1,000 Daltons, greater than about 5,000 Daltons, or greater than about 10,000 Daltons, are retained, while lower molecular weight species pass through. For instance, UF membrane systems with a molecular weight cut-off of 10,000 Daltons can be used in the dairy industry for separating and concentrating milk proteins. In some embodiments, the step of ultrafiltering utilizes a membrane system having pore sizes in a range from about 0.01 to about 0.1 µm, and operating pressures typically in the 15-150 psig range, or the 45-150 psig range. While not being limited thereto, the ultrafiltration step often can be conducted at a temperature in a range from about 5 to about 45° C.

In step (b), the UF permeate fraction can be subjected to a nanofiltration step to produce a NF permeate fraction and a NF retentate fraction. Nanofiltration in the dairy industry typically uses membrane elements that retain particles with molecular weights above approximately 100-300 Da. Nanofiltration is a pressure driven process in which the liquid is forced through a membrane under pressure, and materials having a molecular weight greater than the specified cut-off are retained, while smaller particles pass though the membrane pores. For generally separating lactose from minerals in a UF permeate stream, a pore size can be selected for maximum retention of lactose. Like ultrafiltration, nanofiltration can simultaneously perform both concentration and separation.

Nanofiltering of the UF permeate fraction can be conducted using nanofiltration membranes with pore sizes that typically are in the 0.001 to 0.01 micron range, for example, pore sizes in a range from about 0.001 to about 0.008 µm. In some embodiments, the step of nanofiltration utilizes a membrane system having pore sizes in a range from 0.001 to about 0.01 µm, with operating pressures typically in the 150-450 psig range, and operating temperatures ranging from about 10 to about 60° C. (or from about 15 to about 45° C.), although not limited thereto.

In step (c), the NF retentate fraction can be subjected to a diafiltration step to produce a DF/NF permeate fraction and a DF/NF retentate fraction. Generally, the diafiltration step is performed using nanofiltration membranes, such as described above. However, other membranes can be used for the diafiltration step. In one embodiment, diafiltering the NF retentate fraction can comprise diafiltering a mixture of the NF retentate fraction and water. In another embodiment, diafiltering the NF retentate fraction can comprise diafiltering a mixture of the NF retentate fraction and the concentrated mineral fraction. In another embodiment, diafiltering the NF retentate fraction can comprise diafiltering a mixture of the NF retentate fraction and the milk water fraction. In yet another embodiment, diafiltering the NF retentate fraction can comprise diafiltering a mixture of the NF retentate fraction and the NF permeate fraction. In still another embodiment, diafiltering the NF retentate fraction can comprise diafiltering a mixture of the NF retentate fraction and any combination of water, the concentrated mineral fraction, the milk water fraction, and/or the NF permeate fraction—to produce the DF/NF permeate fraction and the DF/NF retentate fraction.

When the NF retentate fraction is mixed with (diluted with) another component (e.g., water, the concentrated mineral fraction, the milk water fraction, and/or the NF permeate fraction) prior to introduction into the nanofiltration membrane system, the weight ratio of the other component to the NF retentate fraction often ranges from about 0.1:1 to about 1:1, from about 0.2:1 to about 0.8:1, or from about 0.3:1 to about 0.7:1, but is not limited thereto.

The diafiltration—using nanofiltration membranes—can be conducted at any suitable concentration factor, non-limiting examples of which include from about 1.2 to about 5, from about 1.3 to about 4, from about 1.2 to about 3, or from about 2 to about 3.

Thus, as described herein, the diafiltration in step (c) can be used to purify a lactose-rich stream (the NF retentate) and to extract additional minerals from the NF retentate. Generally, diafiltering the NF retentate fraction can comprise diafiltering (e.g., through a nanofiltration membrane) a mixture of the NF retentate fraction and any suitable amount of water, the concentrated mineral fraction, the milk water fraction, and/or the NF permeate fraction. This results in the DF/NF permeate fraction (with minerals extracted from the NF retentate) and the DF/NF retentate fraction (which is lactose-rich).

Optionally, the methods disclosed herein can further comprise a step of subjecting the DF/NF retentate fraction to a reverse osmosis step and/or a forward osmosis step.

In step (d), the NF permeate fraction, the DF/NF permeate fraction, or a combination thereof, can be subjected to a reverse osmosis step to produce a concentrated mineral fraction and a milk water fraction. Reverse osmosis is a fine filtration process or concentration process in which substantially all the remaining milk components are retained (e.g., a concentrated mineral fraction), and only water (milk water) passes through. Often, reverse osmosis membrane systems have a molecular weight cutoff of much less than 100 Da and, therefore, components other than water are concentrated in the reverse osmosis process (e.g., minerals). Generally, reverse osmosis comprises a membrane system having pore sizes of less than or equal to about 0.001 µm. Operating pressures typically are in the 450-1500 psig, or 450-600 psig, range. Temperatures ranging from about 5 to about 45° C., or from about 15 to about 45° C., often can used. In one embodiment, the NF permeate fraction is subjected to reverse osmosis, while in another embodiment, the DF/NF permeate fraction is subjected to reverse osmosis, and in yet another embodiment, both the NF permeate fraction and the DF/NF permeate fraction—separately or mixed in any relative proportion—are subjected to reverse osmosis.

Step (e) of the first method of making a dairy composition comprises combining at least two of the UF retentate fraction, the DF/NF retentate fraction, the concentrated mineral fraction, the milk water fraction, and a fat-rich fraction to form the dairy composition. Any combinations of these components can be mixed or combined, in any suitable relative proportions, to form the dairy composition. Moreover, an ingredient and/or an additional milk fraction also can be added in the combining step. Additionally or alternatively, an ingredient and/or an additional milk fraction can be added to the dairy composition after the combining step. Non-limiting examples of suitable ingredients can include a sugar/sweetener, a flavorant, a preservative (e.g., to prevent yeast or mold growth), a stabilizer, an emulsifier, a prebiotic substance, a special probiotic bacteria, a vitamin, a mineral, an omega 3 fatty acid, a phyto-sterol, an antioxidant, or a colorant, and the like, as well as any mixture or combination thereof.

The additional milk fraction can be a "component-rich fraction," which is meant to encompass any fraction containing at least 15% more of a component of milk (protein, lactose/sugar, fat, minerals) than that found in cow's milk. For instance, a lactose-rich fraction often can contain from about 6 to about 20 wt. % sugar (i.e., in any form, such as lactose, glucose, galactose, etc.), from about 6 to about 18 wt. % sugar, or from about 7 to about 16 wt. % sugar. A mineral-rich fraction can contain from about 1 to about 20 wt. % minerals, from about 1 to about 10 wt. % minerals, or from about 1.5 to about 8 wt. % minerals. A fat-rich fraction often can contain from about 8 to about 50 wt. % fat, from about 20 to about 50 wt. % fat, or from about 30 to about 45 wt. % fat.

These component-rich milk fractions can be produced as described herein or by any technique known to those of skill in the art, such as by membrane filtration processes disclosed in U.S. Pat. Nos. 7,169,428, 9,510,606, and 9,538,770, which are incorporated herein by reference in their entirety. Additionally or alternatively, the component-rich milk fraction (or milk fractions) can be produced by a process comprising mixing water and a powder ingredient (e.g., protein powder, lactose powder, mineral powder, etc.).

Any suitable vessel and conditions can be used for any combining step disclosed herein, and such can be accomplished batchwise or continuously. As an example, the components can be combined in a suitable vessel (e.g., a tank, a silo, etc.) under atmospheric pressure, optionally with agitation or mixing, and optionally with an ingredient (or ingredients) and/or an additional milk fraction (or milk fractions), to form a batch of the finished dairy composition. As another example, the components can be combined continuously in a pipe or other suitable vessel under slight pressure (e.g., 5-50 psig), optionally mixed with ingredients and/or additional milk fractions, and the finished dairy composition can be transferred to a storage tank or filled into containers for retail distribution and sale. Representative systems that can be used for this continuous combining, mixing, and/or packaging can include tetra aldose systems and tetra flexidose systems. Other appropriate methods, systems, and apparatus for combining the components and other ingredients and/or milk fractions are readily apparent from this disclosure.

In one embodiment, for instance, step (e) can comprise combining, at a minimum, the UF retentate fraction and the concentrated mineral fraction, while in another embodiment, step (e) can comprise combining, at a minimum, the fat-rich fraction, the UF retentate fraction, and the concentrated mineral fraction. Lactase enzyme can be added to each component prior to the combining step, or to the resultant dairy composition. As described herein, these components can be combined in any suitable proportions, and optionally, any suitable ingredient and/or additional milk fraction can added in step (e) to form the dairy composition. Additionally or alternatively, any suitable ingredient and/or additional milk fraction can be added to the dairy composition after the combining step.

Consistent with embodiments of this invention, the UF retentate fraction can be treated with lactase enzyme prior to the combining step, if desired. Likewise, if desired, the DF/NF retentate fraction can be treated with lactase enzyme prior to the combining step. Additionally or alternatively, the lactase enzyme can be added during step (e), or the dairy composition—after step (e)—can be treated with lactase enzyme. In these circumstances, the lactose content can be reduced to less than about 1 wt. %, less than about 0.5 wt. %, less than about 0.2 wt. %, or less than about 0.1 wt. %.

Optionally, the methods described herein can further comprise a step of microfiltering the milk product (e.g., skim milk) prior to the ultrafiltering step, resulting in a MF permeate fraction and a MF retentate fraction. In such instances, step (a) can comprise ultrafiltering the MF permeate fraction to produce a UF permeate fraction and a UF retentate fraction. Microfiltering can be conducted using microfiltration membranes with relatively large pore sizes that typically are in the 0.1 to 10 micron range, for example, pore sizes in a range from about 0.2 to about 2 μm, or from about 0.1 to about 0.2 μm. In some embodiments, the step of microfiltering utilizes a membrane system having pore sizes in a range from about 0.1 to about 0.2 μm, with operating pressures typically less than about 75 psig (e.g., 10-15 psig) and operating temperatures ranging from about 5 to about 60° C. (or from about 35 to about 55° C.), although not limited thereto.

Often, microfiltration membranes can be used in the dairy industry to remove bacteria, bacterial spores, somatic cells, and other extraneous suspended materials from fluid milk, and therefore improve the quality and shelf-life of the resultant milk product. Microfiltration membranes can be used to separate fat from cheese or cheese whey and to separate milk fat from fluid milks, as an alternative to centrifugal separation.

Optionally, the methods described herein can further comprise a step of diafiltering the UF retentate fraction (UF concentrate) to form a DF/UF permeate fraction and a DF/UF retentate fraction. In such instances, step (b) can comprise nanofiltering the DF/UF permeate fraction to produce a NF permeate fraction and a NF retentate fraction. Also, if desired, the DF/UF permeate fraction can be mixed with the UF permeate fraction (i.e., not diafiltered) in any relative proportions, followed by nanofiltration.

The protein content of the UF retentate fraction often can be at least about 5 wt. %, at least about 6 wt. %, at least about 7 wt. %, at least about 8 wt. %, or at least about 9 wt. % protein. Illustrative and non-limiting ranges for the protein content of the UF retentate can include from about 5 to about 20 wt. % protein, from about 6 to about 18 wt. % protein, or from about 9 to about 15 wt. % protein.

Similarly, while not being limited thereto, the lactose content of the UF permeate fraction and/or the UF retentate fraction generally can be less than or equal to about 7 wt. %, or less than or equal to about 6 wt. %, but greater than or equal to about 3 wt. %, or greater than or equal to about 3.5 wt. %.

The lactose content of the NF retentate fraction and/or the DF/NF retentate fraction can be at least about 6 wt. %, at least about 7 wt. %, at least about 8 wt. %, at least about 9 wt. %, or at least about 10 wt. % lactose, but is not limited thereto. Illustrative and non-limiting ranges for the lactose content of the NF retentate fraction and/or the DF/NF retentate fraction can include from about 6 to about 20 wt. %, from about 6 to about 18 wt. %, from about 7 to about 16 wt. %, from about 8 to about 18 wt. %, or from about 10 to about 16 wt. % lactose. The NF retentate fraction and the DF/NF retentate fraction contain minimal amounts of protein, typically less than about 1 wt. %, less than about 0.7 wt. %, less than about 0.5 wt. %, or less than about 0.3 wt. % protein.

The concentrated mineral fraction, after the reverse osmosis step, often contains less than or equal to about 0.5 wt. % lactose, or less than or equal to about 0.4 wt. % lactose, and contains at least about 0.2 wt. % minerals, or at least about 0.3 wt. % minerals. These amounts can vary depending upon the component (and amount thereof) that is combined with the NF retentate fraction prior to diafiltration, and the concentration factor employed in the diafiltration step. Generally, the milk water fraction is substantially free of all of the milk components—fat, protein, lactose, and minerals. For instance, the milk water fraction can contain less than or equal to about 0.1 wt. % lactose, and less than or equal to about 0.1 wt. % minerals. Further, the milk water fraction can contain less than or equal to about 0.1 wt. % fat, and less than or equal to about 0.1 wt. % protein, and at least about 95 wt. % water, at least about 98 wt. % water, at least about 99 wt. % water, or at least about 99.5 wt. % water.

Referring now to the second method for making a dairy composition, this method can comprise (or consist essentially of, or consist of) (i) ultrafiltering a milk product to produce a UF permeate fraction and a UF retentate fraction, (ii) nanofiltering the UF permeate fraction to produce a NF permeate fraction and a NF retentate fraction, (iii) diafiltering the NF retentate fraction to produce a DF/NF permeate fraction and a DF/NF retentate fraction, (iv) subjecting the NF permeate fraction, the DF/NF permeate fraction, or a combination thereof, to a forward osmosis step to produce a mineral concentrate and a milk water fraction, and (v) combining at least two of the UF retentate fraction, the DF/NF retentate fraction, the mineral concentrate, the milk water fraction, and a fat-rich fraction to form the dairy composition. Any features or characteristics of step (i), step (ii), and step (iii) can be the same as corresponding step (a), step (b), and step (c) described hereinabove for the first method for making a dairy composition.

For instance, the second method can further comprise a step of separating (e.g., centrifugally separating) a raw milk or fresh milk (whole milk) into the milk product (also referred to as skim milk) and a fat-rich fraction (also referred to as cream or butter fat). Likewise, in step (iii) of the second method, the NF retentate fraction can be subjected to a diafiltration step to produce a DF/NF permeate fraction and a DF/NF retentate fraction, and a nanofiltration membrane can be used. In step (iii), diafiltering the NF retentate fraction can comprise diafiltering a mixture of the NF retentate fraction and water, a mixture of the NF retentate fraction and the concentrated mineral fraction, a mixture of the NF retentate fraction and the milk water fraction, a mixture of the NF retentate fraction and the NF permeate fraction, or a mixture of the NF retentate fraction and any combination of water, the concentrated mineral fraction, the milk water fraction, and/or the NF permeate fraction—to produce the DF/NF permeate fraction and the DF/NF retentate fraction.

In step (iv) of the second method, the NF permeate fraction, the DF/NF permeate fraction, or a combination thereof, can be subjected to a forward osmosis step to produce a mineral concentrate and a milk water fraction. Forward osmosis is typically performed at much lower pressures than reverse osmosis, and utilizes a semi-permeable membrane system having pore sizes such that water passes through, while other materials (e.g., proteins, fats, lactose or other sugars, and minerals) do not. Operating pressures typically are less than about 50 psig, and temperatures ranging from about 5 to about 50° C. often can used, while not being limited thereto. As compared to reverse osmosis, forward osmosis can achieve higher solids (e.g., often up to 40-60 wt. %), and is less susceptible to fouling. In one embodiment, the NF permeate fraction is subjected to forward osmosis, while in another embodiment, the DF/NF permeate fraction is subjected to forward osmosis, and in yet another embodiment, both the NF permeate fraction and the DF/NF permeate fraction—separately or mixed in any relative proportion—are subjected to forward osmosis.

Step (v) of the second method of making a dairy composition comprises combining at least two of the UF retentate fraction, the DF/NF retentate fraction, the mineral concentrate, the milk water fraction, and a fat-rich fraction to form the dairy composition. Any combinations of these components can be mixed or combined, in any suitable relative proportions, to form the dairy composition. Moreover, an ingredient and/or an additional milk fraction also can be added in the combining step. Additionally or alternatively, an ingredient and/or an additional milk fraction can be added to the dairy composition after the combining step. Illustrative examples of suitable ingredients and additional milk fractions are discussed above in relation to the first method of making a dairy composition, and these ingredients and additional milk fractions can be utilized without limitation in the same manner in the second method of making a dairy composition. Likewise, suitable methods, systems, and apparatus for combining the components and other ingredients and/or milk fractions pertaining to the first method are equally applicable to the second method.

For instance, in one embodiment, step (v) can comprise combining, at a minimum, the UF retentate fraction and the mineral concentrate, while in another embodiment, step (v) can comprise combining, at a minimum, the fat-rich fraction, the UF retentate fraction, and the mineral concentrate. Lactase enzyme can be added to each component prior to the combining step, or to the resultant dairy composition. As described herein, these components can be combined in any suitable proportions, and optionally, any suitable ingredient and/or additional milk fraction can added in step (v) to form the dairy composition. Additionally or alternatively, any suitable ingredient and/or additional milk fraction can be added to the dairy composition after the combining step.

Consistent with the second method of making a dairy composition, the UF retentate fraction can be treated with lactase enzyme prior to the combining step, if desired. Likewise, if desired, the DF/NF retentate fraction can be treated with lactase enzyme prior to the combining step. Additionally or alternatively, the lactase enzyme can be added during step (v), or the dairy composition—after step (v)—can be treated with lactase enzyme. Optionally, the methods described herein can further comprise a step of microfiltering the milk product prior to the ultrafiltering step. Additionally or alternatively, the methods described herein, optionally, can further comprise a step of diafiltering the UF retentate fraction (UF concentrate) to form a DF/UF permeate fraction and a DF/UF retentate fraction, followed by nanofiltering the DF/UF permeate fraction.

The compositional features of the UF retentate fraction, the UF permeate fraction, the NF retentate fraction, the DF/NF retentate fraction, and the milk water fraction disclosed in relation to the first method also apply equally to the second method. The mineral concentrate, after the forward osmosis step, often contains less than or equal to about 0.5 wt. % lactose, or less than or equal to about 0.4 wt. % lactose, and contains at least about 0.2 wt. % minerals, or at least about 0.3 wt. % minerals. These amounts can vary depending upon the component (and amount thereof) that is combined with the NF retentate fraction prior to diafiltration, and the concentration factor employed in the diafiltration step.

Consistent with embodiments of the first and second methods for making a dairy composition disclosed herein, these methods can further comprise a step of treating the respective dairy composition with lactase enzyme, if desired. Accordingly, the lactose content can be reduced to less than about 1 wt. %, less than about 0.5 wt. %, less than about 0.2 wt. %, or less than about 0.1 wt. %.

Moreover, these methods also can further comprise a step of heat treating the dairy composition. In one embodiment, the step of heat treating can comprise pasteurizing at a temperature in a range from about 80° C. to about 95° C. for a time period in a range from about 2 to about 15 minutes. In another embodiment, the step of heat treating can comprise UHT sterilization at a temperature in a range from about 135° C. to about 145° C. for a time period in a range from about 1 to about 10 seconds. Other appropriate pasteurization or sterilization temperature and time conditions are readily apparent from this disclosure. Further, this invention is not limited by the method or equipment used for performing the pasteurization/sterilization process—any suitable technique and apparatus can be employed, whether operated batchwise or continuously.

In some embodiments of this invention, the first and second methods for making a dairy composition, after a heat treatment step, can further comprise a step of packaging (aseptically or otherwise) the dairy composition in any suitable container and under any suitable conditions. Thus, after combining the various components, ingredients, and additional milk fractions as described herein to form the dairy composition, the dairy composition can be packaged under aseptic conditions (or non-aseptic conditions) in a container. Any suitable container can be used, such as might be used for the distribution and/or sale of dairy products in a retail outlet. Illustrative and non-limiting examples of typical containers include a cup, a bottle, a bag, or a pouch, and the like. The container can be made from any suitable material, such as glass, metal, plastics, and the like, as well as combinations thereof.

While not being limited thereto, the dairy composition can have a protein content of from about 1 to about 15 wt. %, or from about 3 to about 10 wt. %. Additionally or alternatively, the dairy composition can have a fat content of from about 0.05 to about 10 wt. %, or from about 0.1 to about 5 wt. %. Additionally or alternatively, the dairy composition can have a mineral content of from about 0.5 to about 2 wt. %. Additionally or alternatively, the dairy composition can have a lactose content of less than or equal to about 4 wt. %.

A representative and non-limiting example of a dairy composition consistent with this invention can contain less than or equal to about 0.5 wt. % fat, from about 2 to about 15 wt. % protein, from about 0.5 to about 2 wt. % minerals, and less than or equal to about 4 wt. % lactose. Another representative and non-limiting example of a dairy composition consistent with this invention can contain from about 0.5 to about 1.5 wt. % fat, from about 2 to about 15 wt. % protein, from about 0.5 to about 2 wt. % minerals, and less than or equal to about 4 wt. % lactose. Yet, another representative and non-limiting example of a dairy composition consistent with this invention can contain from about 1.5 to about 2.5 wt. % fat, from about 2 to about 15 wt. % protein, from about 0.5 to about 2 wt. % minerals, and less than or equal to about 4 wt. % lactose. Moreover, another representative and non-limiting example of a dairy composition consistent with this invention can contain from about 2.5 to about 5 wt. % fat, from about 2 to about 15 wt. % protein, from about 0.5 to about 2 wt. % minerals, and less than or equal to about 4 wt. % lactose.

Additional non-limiting examples of typical dairy compositions that can be produced by the methods disclosed herein include whole milk, low-fat milk, skim milk, buttermilk, flavored milk, low lactose milk, high protein milk, lactose-free milk, ultra-filtered milk, micro-filtered milk, concentrated milk, evaporated milk, high protein, high calcium, and reduced sugar milk, and the like.

An illustrative and non-limiting example of a suitable separations process consistent with embodiments of this invention is shown in FIG. 1. First, fresh whole milk is separated into cream and a skim milk product. The skim milk product is then subjected to ultrafiltration, such as via a polymeric membrane system, as described herein, resulting in a UF retentate often referred to as a protein-rich milk fraction, and a UF permeate. The UF permeate is then subjected to nanofiltration, resulting in a NF permeate and a NF retentate (which is lactose-rich).

The NF retentate in FIG. 1 is subjected to diafiltration, resulting in a DF/NF permeate fraction and a DF/NF retentate fraction (which is lactose-rich). The NF permeate fraction and the DF/NF permeate fraction (either separately or combined) are then subjected to reverse osmosis, resulting in a RO permeate fraction (milk water fraction) and a RO retentate fraction (concentrated mineral fraction). Instead of reverse osmosis, the NF permeate fraction, the DF/NF permeate fraction, or both, can be subjected to forward osmosis.

Beneficially, the methods disclosed herein can extract or recover significant amounts of minerals from the lactose-rich NF retentate fraction. For instance, a total mineral content, on a weight basis, of the NF permeate fraction and the DF/NF permeate fraction can be at least about 10 wt. % greater than that of the NF permeate fraction (i.e., the mineral content of the NF permeate fraction). In some embodiments, the total mineral content, on a weight basis, can be at least about 15 wt. % greater, at least about 20 wt. % greater, at least about 25 wt. % greater, or at least about 30 wt. % greater, and often can range up to about 50-60 wt. % greater. As disclosed herein, mineral contents are quantified by the ash test.

Similarly, a total mineral content, on a weight basis, of the concentrated mineral fraction (or the mineral concentrate) formed from both the NF permeate fraction and the DF/NF permeate fraction can at least about 10 wt. % greater than that of a concentrated mineral fraction (or a mineral concentrate) formed only from the NF permeate fraction. In some embodiments, the total mineral content, on a weight basis, can be at least about 15 wt. % greater, at least about 20 wt. % greater, at least about 25 wt. % greater, or at least about 30 wt. % greater, and often can range up to about 50-60 wt. % greater.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

Ash is the residue remaining after ignition in a suitable apparatus at 550° C. to a constant weight; such treatment at 550° C. typically eliminates all organic matter, with the remaining material being primarily minerals (Standard Methods for the examination of dairy products, $17^{th}$ edition (2004), American Public Health Association, Washington D.C.). The ash test was performed by using a Phoenix (CEM Microwave Furnace), which heated the samples at 550° C. for 30 min. The ash content (or mineral content) was determined in wt. %.

Example 1

Example 1 summarizes a series of experiments in which raw milk was separated into cream (a fat-rich fraction) and skim milk, which was subjected to an ultrafiltration step to produce a UF permeate fraction and a UF retentate fraction (a protein-rich fraction), having the respective compositions (concentration ranges) shown in Table I. The OF permeate fraction then was subjected to a nanofiltration step to produce a NF permeate fraction and a NF retentate fraction (a lactose-rich fraction), followed by subjecting the NF permeate fraction to reverse osmosis to produce a RO retentate fraction (a mineral-rich fraction) and a RO permeate fraction (a milk water fraction). In Table I, the mineral content (in wt. %) is generally similar to the ash content (wt. %), and thus the result of an ash test is used for quantification of the total mineral content in this disclosure. For each of the milk fractions in Table I, Table II summarizes the respective Ca, Mg, Na, K, Cl, and P contents (concentration ranges) in ppm by weight.

Specific Ca, Mg, Na, and K contents were determined using a Perkin Elmer Atomic Absorption Spectrophotometer. Samples were treated with trichloroacetic acid to precipitate proteins and the filtrate was analyzed by the Atomic Absorption Spectrophotometer. Phosphorus content was determined via Inductively Coupled Plasma Spectrometry (official method of Analysis of AOAC, International 8th edition, methods 965.17 and 985.01). Chlorine content was determined by the official method of analysis of AOAC International $8^{th}$ edition, methods 963.05, 972.27, and 986.26; AOAC International, Gaithersburg, Md. (2005).

Example 2

In the diafiltration experiment of Example 2, 65 parts by weight of a NF retentate fraction (a lactose-rich fraction) were mixed with (diluted with) 35 parts by weight of water to form a diluted NF retentate fraction having the composition shown in Table III Next, the diluted NF retentate fraction was subjected to diafiltration (using nanofiltration membranes) at a concentration factor of 2.27 (44 parts of retentate and 56 parts of permeate) to produce a DF/NF permeate fraction and a DF/NF retentate fraction (a lactose-rich fraction), followed by subjecting the DF/NF permeate fraction to reverse osmosis (concentration factor of 2) to produce a DF/RO retentate fraction (a mineral-rich fraction) and a DF/RO permeate fraction (a milk water fraction). As shown in Table III, the DF/NF retentate fraction had an increased amount of lactose relative to the total minerals content. Also beneficially, additional minerals were recovered in the DF/NF permeate from the NF retentate fraction. Note that the DF/RO retentate fraction does not include any contribution from a NF permeate fraction, thus the minerals in the DF/RO retentate fraction are additional minerals extracted from the NF retentate fraction.

For each of the milk fractions in Table III, Table IV summarizes the respective Ca, Mg, Na, and K contents (concentration ranges) in ppm by weight. Beneficially, significant amounts of sodium and potassium were recovered in the DF/NF permeate from the NF retentate fraction.

Example 3

In Example 3, 1480 kg of a OF permeate fraction having the composition shown in Table V were subjected to a nanofiltration step (at a concentration factor of 2.28) to produce a NF permeate fraction and a NF retentate fraction (a lactose-rich fraction). The NF permeate and NF retentate compositions were determined at various time intervals after the start of the experiment, as shown in Table V, as well as a composite composition for each. Of the 1480 kg of the OF permeate, 831 kg of NF permeate (56 wt. %) and 649 kg of NF retentate (44 wt. %) resulted. The NF retentate fraction contained virtually all of the lactose, but a significant amount of minerals (~85 wt. %) also resided in the NF retentate fraction.

In the diafiltration step of Example 3, the 649 kg of the NF retentate fraction (lactose-rich fraction, but also with a high mineral content) were mixed with (diluted with) 389 kg of water at a temperature of 5-8° C. to form a diluted NF retentate fraction having the composition shown in Table VI. Next, the diluted NF retentate fraction was subjected to diafiltration (using nanofiltration membranes) at a concentration factor of 1.3 (77 parts of retentate and 23 parts of permeate) to produce a DF/NF permeate fraction and a DF/NF retentate fraction (a lactose-rich fraction). Importantly, an additional 0.43 kg of the minerals originally in the NF retentate fraction were recovered in the DF/NF permeate fraction, which would have otherwise been unrecovered in a process without a diafiltration step. Beneficially, when the DF/NF permeate fraction (0.43 kg minerals) is combined with the NF permeate fraction (1.19 kg minerals), the total mineral content—after reverse osmosis—in a RO retentate fraction (a mineral-rich fraction) would be increased, unexpectedly, by 36 wt. % due to the diafiltration step (1.62 kg versus 1.19 kg).

Example 4

In Example 4, dairy compositions were produced having the respective compositions shown in Table VII by blending, at appropriate relative amounts, the OF retentate fraction (see Tables I-II), the cream or fat-rich fraction (see Tables I-II), and a concentrated mineral fraction formed by combining the RO retentate from the NF permeate (see Tables I-II) and the DF/RO retentate (see Tables III-IV). Thus, a diverse set of dairy compositions were produced the methods described herein, having a wide range of fat, protein, lactose, mineral (ash), and total solids contents.

TABLE I

Summary of Example 1 compositions.

| | Fat (wt. %) | Protein (wt. %) | Lactose (wt. %) | Minerals (wt. %) | Total solids (wt. %) |
|---|---|---|---|---|---|
| Raw milk | 3.5-4.0 | 3.0-3.5 | 4.7-5.0 | 0.70-0.80 | 12.30-12.50 |
| Cream | 40-45 | 1.7-2.0 | 2.0-3.0 | 0.3-0.4 | 45-48 |
| Skim milk | 0.08-0.2 | 3.1-3.6 | 4.75-5.05 | 0.75-0.85 | 9.0-9.2 |
| UF retentate | 0.3-0.4 | 10-20 | 4.5-5.0 | 1.3-1.6 | 16-20 |
| UF permeate | 0 | 0.15-0.25 | 4-5 | 0.4-0.6 | 5-6 |
| NF retentate | 0.1 | 0.18-0.40 | 10-14 | 0.8-0.9 | 11-15 |
| NF permeate | 0 | 0 | 0.07-0.10 | 0.2-0.3 | 0.3-0.5 |
| RO retentate | 0 | 0.01-0.05 | 0.1-0.3 | 0.4-0.6 | 0.8-0.9 |
| RO permeate | 0 | 0 | 0 | 0.03-0.04 | 0.04-0.06 |

TABLE II

Summary of Example 1 mineral compositions.

| | Calcium (ppm) | Magnesium (ppm) | Sodium (ppm) | Potassium (ppm) | Chloride (ppm) | Phosphorus (ppm) |
|---|---|---|---|---|---|---|
| Raw milk | 1210-1250 | 100-120 | 380-420 | 1600-1620 | 730-750 | 1000-1020 |
| Cream | 550-570 | 50-70 | 220-240 | 880-900 | 590-610 | 540-560 |
| Skim milk | 1240-1260 | 110-130 | 380-420 | 1610-1630 | 950-970 | 1000-1020 |
| UF retentate | 3300-3400 | 220-230 | 460-480 | 1810-1830 | 940-960 | 2230-2250 |
| UF permeate | 460-500 | 60-70 | 390-410 | 1480-1500 | 960-965 | 480-500 |
| NF retentate | 870-900 | 150-170 | 540-560 | 2160-2180 | 710-730 | 940-960 |
| NF permeate | 50-100 | <10 | 230-250 | 980-1000 | 1060-1080 | 50-70 |
| RO retentate | 160-200 | 20-40 | 860-880 | 3720-3740 | 4110-4130 | 170-190 |
| RO permeate | 0 | 0 | 20-30 | 30-40 | 50-60 | 0 |

TABLE III

Summary of Example 2 compositions.

| | Fat (wt. %) | Protein (wt. %) | Lactose (wt. %) | Minerals (wt. %) | Total solids (wt. %) |
|---|---|---|---|---|---|
| Diluted NF retentate | 0 | 0.14 | 9.44 | 0.716 | 11.44 |
| DF/NF retentate | 0 | 0.20 | 12.77 | 0.757 | 12.77 |
| DF/NF permeate | 0 | 0.10 | 0.21 | 0.171 | 0.96 |
| DF/RO retentate | 0 | 0.22 | 0.37 | 0.363 | 1.13 |
| DF/RO permeate | 0 | 0 | 0 | 0 | 0.07 |

TABLE IV

Summary of Example 2 mineral compositions.

|  | Calcium (ppm) | Magnesium (ppm) | Sodium (ppm) | Potassium (ppm) |
|---|---|---|---|---|
| Diluted NF retentate | 990-1010 | 180-200 | 710-730 | 1880-1920 |
| DF/NF retentate | 1250-1270 | 230-250 | 680-700 | 1770-1790 |
| DF/NF permeate | 70-80 | 20-40 | 300-320 | 690-710 |
| DF/RO retentate | 120-130 | 30-35 | 330-340 | 1190-1210 |
| DF/RO permeate | 0 | 1-2 | 70-80 | 140-160 |

TABLE V

Summary of Example 3 nanofiltration step.

|  | Time (min) | Minerals (wt. %) | Lactose (wt. %) | Ca (ppm) | Mg (ppm) | Na (ppm) | K (ppm) | Quantity (kg) | Minerals (kg) | Lactose (kg) |
|---|---|---|---|---|---|---|---|---|---|---|
| UF Permeate | — | 0.528 | 4.59 | 410 | 122 | 730 | 1742 | 1480 | 7.81 | 67.9 |
| NF permeate | 30 | 0.178 | 0.02 | 50 | 120 | 576 | 1399 |  |  |  |
| NF permeate | 50 | 0.182 | 0 | 35 | 131 | 607 | 1869 |  |  |  |
| NF permeate | 70 | 0.185 | 0 | 28 | 128 | 594 | 2006 |  |  |  |
| NF permeate | 90 | 0.204 | 0 | 45 | 126 | 655 | 1836 |  |  |  |
| NF permeate | Composite | 0.143 | 0 | 14 | 124 | 483 | 1674 | 831 | 1.19 | 0 |
| NF retentate | 30 | 0.580 | 5.01 | 619 | 109 | 434 | 1588 |  |  |  |
| NF retentate | 50 | 0.721 | 5.91 | 701 | 115 | 448 | 1580 |  |  |  |
| NF retentate | 70 | 0.816 | 7.73 | 780 | 127 | 583 | 1966 |  |  |  |
| NF retentate | 90 | 0.956 | 9.75 | 953 | 130 | 595 | 1904 |  |  |  |
| NF retentate | Composite | 1.020 | 10.45 | 1056 | 122 | 533 | 1637 | 649 | 6.62 | 67.8 |

TABLE VI

Summary of Example 3 diafiltration step.

|  | Time (min) | Minerals (wt. %) | Lactose (wt. %) | Ca (ppm) | Mg (ppm) | Na (ppm) | K (ppm) | Quantity (kg) | Minerals (kg) |
|---|---|---|---|---|---|---|---|---|---|
| Diluted NF retentate | — | 0.637 | 6.53 |  |  |  |  | 1038 | 6.61 |
| DF/NF permeate | 15 | 0.185 | 0.03 | 41 | 123 | 482 | 1743 |  |  |
| DF/NF permeate | 50 | 0.194 | 0.01 | 74 | 122 | 559 | 1837 |  |  |
| DF/NF permeate | 85 | 0.167 | 0 | 49 | 96 | 532 | 1253 |  |  |
| DF/NF permeate | Composite | 0.180 | 0.01 |  |  |  |  | 237 | 0.43 |
| DF/NF retentate | 15 | 0.702 | 6.32 | 638 | 134 | 574 | 1930 |  |  |
| DF/NF retentate | 50 | 0.821 | 7.13 | 710 | 131 | 485 | 1761 |  |  |
| DF/NF retentate | 85 | 0.734 | 7.94 | 754 | 128 | 531 | 1634 |  |  |
| DF/NF retentate | 105 | 0.777 | 8.51 | 859 | 132 | 496 | 1796 |  |  |
| DF/NF retentate | Composite | 0.771 | 8.46 | 825 | 121 | 520 | 1820 | 801 | 6.18 |

TABLE VII

Summary of Example 4 dairy compositions.

|  | Fat (wt. %) | Protein (wt. %) | Lactose (wt. %) | Minerals (wt. %) | Total solids (wt. %) |
|---|---|---|---|---|---|
| Fat free | 0.1-0.2 | 4-12 | 1-4 | 0.7-1.2 | 8.5-15 |
| Low fat | 0.85-1.0 | 4-12 | 1-4 | 0.7-1.2 | 9.5-16 |
| Reduced fat | 1.85-2.1 | 4-12 | 1-4 | 0.7-1.2 | 10.5-17 |
| Full fat | 3.25-4.0 | 4-12 | 1-4 | 0.7-1.2 | 11.5-20 |

We claim:

1. A method for making a dairy composition, the method comprising:
   (a) ultrafiltering a milk product to produce a UF permeate fraction and a UF retentate fraction;
   (b) nanofiltering the UF permeate fraction to produce a NF permeate fraction and a NF retentate fraction;
   (c) diafiltering the NF retentate fraction to produce a DF/NF permeate fraction and a DF/NF retentate fraction;
   (d) subjecting the NF permeate fraction, the DF/NF permeate fraction, or a combination thereof, to a reverse osmosis step to produce a concentrated mineral fraction and a milk water fraction; and
   (e) combining at least two of the UF retentate fraction, the DF/NF retentate fraction, the concentrated mineral fraction, the milk water fraction, and a fat-rich fraction to form the dairy composition.

2. The method of claim 1, wherein the combining step comprises combining:
   the UF retentate fraction; and
   the concentrated mineral fraction.

3. The method of claim 1, wherein the combining step comprises combining:
   the fat-rich fraction;
   the UF retentate fraction; and
   the concentrated mineral fraction.

4. The method of claim 1, wherein the milk product comprises skim milk or whole milk.

5. The method of claim 1, wherein the method further comprises a step of separating a raw milk into the milk product and the fat-rich fraction.

6. The method of claim 1, wherein:
   the UF retentate fraction and/or the DF/NF retentate fraction is/are treated with lactase enzyme prior to the combining step; and/or
   the method further comprises a step of treating the dairy composition with lactase enzyme.

7. The method of claim 1, wherein a lactose content of the DF/NF retentate fraction is at least about 10 wt. %.

8. The method of claim 1, wherein:
   the dairy composition is whole milk, low-fat milk, skim milk, buttermilk, flavored milk, low lactose milk, high protein milk, lactose-free milk, ultra-filtered milk, micro-filtered milk, concentrated milk, evaporated milk, or high protein, high calcium, and reduced sugar milk; and the combining step further comprises the addition of an ingredient, wherein the ingredient comprises a sugar/sweetener, a flavorant, a preservative, a stabilizer, an emulsifier, a prebiotic substance, a special probiotic bacteria, a vitamin, a mineral, an omega 3 fatty acid, a phyto-sterol, an antioxidant, a colorant, or any combination thereof.

9. The method of claim 1, wherein the method further comprises a step of heat treating the dairy composition.

10. The method of claim 1, wherein:
the concentrated mineral fraction comprises less than or equal to about 0.5 wt. % lactose and at least about 0.3 wt. % minerals; and
the milk water fraction comprises less than or equal to about 0.1 wt. % lactose and less than or equal to about 0.1 wt. % minerals.

11. The method of claim 1, wherein the method further comprises:
a step of subjecting the DF/NF retentate fraction to a reverse osmosis step and/or a forward osmosis step; and/or
a step of diafiltering the UF retentate fraction prior to the nanofiltering step.

12. The method of claim 1, wherein diafiltering the NF retentate fraction comprises diafiltering a mixture of (1) the NF retentate fraction and (2) water, the concentrated mineral fraction, the milk water fraction, the NF permeate fraction, or a combination thereof.

13. The method of claim 1, wherein a total mineral content, on a weight basis, of the NF permeate fraction and the DF/NF permeate fraction is at least about 10 wt. % greater than that of the NF permeate fraction.

14. The method of claim 1, wherein a total mineral content, on a weight basis, of the NF permeate fraction and the DF/NF permeate fraction is from about 15 wt. % to about 60 wt. % greater than that of the NF permeate fraction.

15. The method of claim 1, wherein a total mineral content, on a weight basis, of the concentrated mineral fraction formed from both the NF permeate fraction and the DF/NF permeate fraction is at least about 10 wt. % greater than that of a concentrated mineral fraction formed only from the NF permeate fraction.

16. The method of claim 1, wherein a total mineral content, on a weight basis, of the concentrated mineral fraction formed from both the NF permeate fraction and the DF/NF permeate fraction is from about 15 wt. % to about 60 wt. % greater than that of a concentrated mineral fraction formed only from the NF permeate fraction.

17. The method of claim 1, wherein:
the milk product comprises skim milk; and
a lactose content of the DF/NF retentate fraction is from about 6 to about 18 wt. %.

18. The method of claim 17, wherein the combining step comprises combining the UF retentate fraction, the concentrated mineral fraction, and an ingredient.

19. The method of claim 18, wherein:
the milk water fraction comprises less than or equal to about 0.1 wt. % lactose and less than or equal to about 0.1 wt. % minerals; and
the concentrated mineral fraction comprises less than or equal to about 0.5 wt. % lactose.

20. The method of claim 19, wherein the concentrated mineral fraction further comprises at least about 0.2 wt. % minerals.

21. The method of claim 17, wherein the combining step comprises combining the UF retentate fraction, the concentrated mineral fraction, the fat-rich fraction, and an ingredient.

22. The method of claim 21, wherein:
the milk water fraction comprises less than or equal to about 0.1 wt. % lactose and less than or equal to about 0.1 wt. % minerals; and
the concentrated mineral fraction comprises less than or equal to about 0.5 wt. % lactose.

23. The method of claim 22, wherein the concentrated mineral fraction further comprises at least about 0.2 wt. % minerals.

24. The method of claim 17, wherein step (d) comprises subjecting the NF permeate fraction and the DF/NF permeate fraction to the reverse osmosis step to produce the concentrated mineral fraction and the milk water fraction.

* * * * *